US009553985B2

(12) United States Patent
Cohen

(10) Patent No.: US 9,553,985 B2
(45) Date of Patent: Jan. 24, 2017

(54) DETERMINING AND DENYING CALL COMPLETION BASED ON DETECTION OF ROBOCALL OR UNSOLICITED ADVERTISEMENT

(71) Applicant: Meir Cohen, Toms River, NJ (US)

(72) Inventor: Meir Cohen, Toms River, NJ (US)

(*) Notice: Subject to any disclaimer, the term of this patent is extended or adjusted under 35 U.S.C. 154(b) by 421 days.

(21) Appl. No.: 13/685,987

(22) Filed: Nov. 27, 2012

(65) Prior Publication Data
US 2014/0119527 A1 May 1, 2014

Related U.S. Application Data

(60) Provisional application No. 61/718,789, filed on Oct. 26, 2012.

(51) Int. Cl.
H04M 3/42 (2006.01)
H04M 3/436 (2006.01)

(52) U.S. Cl.
CPC ....... *H04M 3/4365* (2013.01); *H04M 3/42059* (2013.01); *H04M 2203/2011* (2013.01); *H04M 2203/2027* (2013.01)

(58) Field of Classification Search
CPC .............. H04M 3/436; H04M 3/42059; H04M 2201/40
USPC ........................... 379/210.02, 210.03, 207.13
See application file for complete search history.

(56) References Cited

U.S. PATENT DOCUMENTS

| 5,991,367 | A | * | 11/1999 | Robuck ..................... 379/88.24 |
| 6,445,775 | B1 | | 9/2002 | Morganstein et al. |
| 6,456,698 | B1 | * | 9/2002 | Morganstein et al. .... 379/88.02 |
| 7,283,969 | B1 | * | 10/2007 | Marsico et al. .............. 705/346 |
| 8,086,461 | B2 | | 12/2011 | De Los Reyes et al. |
| 8,141,152 | B1 | * | 3/2012 | Hwang et al. .................. 726/22 |
| 8,180,646 | B2 | | 5/2012 | Jaiswal et al. |
| 8,224,655 | B2 | | 7/2012 | Strom et al. |
| 2006/0136219 | A1 | | 6/2006 | Wang |
| 2007/0150276 | A1 | * | 6/2007 | Srivastava et al. ........... 704/246 |
| 2008/0175174 | A1 | | 7/2008 | Altberg et al. |
| 2010/0158233 | A1 | * | 6/2010 | Caceres et al. .......... 379/207.02 |
| 2010/0246795 | A1 | * | 9/2010 | Saha et al. ............... 379/210.02 |
| 2011/0274259 | A1 | | 11/2011 | Eng et al. |
| 2011/0294478 | A1 | * | 12/2011 | Trivi et al. .................... 455/415 |

* cited by examiner

*Primary Examiner* — Nafiz E Hoque
(74) *Attorney, Agent, or Firm* — Michael J. Feigin, Esq.; Feigin & Fridman

(57) ABSTRACT

Unwanted calls are detected by determining all calls which are unverified by prior prompting the caller to provide data, such as "press 5 to be connected" or "say 'proceed'" before being allowed to connect. Once connected, the called party may indicate that the call was/is unwanted and should be disconnected. Then, the call is disconnected from the called party while being maintained with the switch. The call is also recorded in embodiments of the disclosed technology, with the audio therefrom, or audio signature, being used to detect future unwanted calls. The detection of future unwanted calls may further be modified or determined based on association of called parties to each other, which, additionally, may be used to change the threshold of closeness of audio signatures between calls.

12 Claims, 5 Drawing Sheets

DETERMINING AND DENYING CALL COMPLETION BASED ON DETECTION OF ROBOCALL OR UNSOLICITED ADVERTISEMENT

FIELD OF THE DISCLOSED TECHNOLOGY

The disclosed technology relates generally to telephone switches and, more specifically, to customized call routing.

BACKGROUND OF THE DISCLOSED TECHNOLOGY

Robocalls or robocalling is defined as a phone call that uses a computerized autodialer to deliver a pre-recorded message. Robocalls are often associated with political and telemarketing campaigns, though there are other uses such as public service or emergency announcements. Such calls are generally unwanted and generally violate the United States "do not call" registry, or skirt the registry by being a political phone call or by having a prior business relationship with the called party. When unwanted, as is the case of most robocalls, such calls waste many thousands of hours of people's time. Despite being punishable by fine, or through loopholes in such regulations, the calls persist, to the annoyance of almost everyone with a telephone.

While other solutions also exist, secondary considerations show that the problem remains unsolved. On Oct. 18, 2012, the Federal Trade Commission, a part of the U.S. federal government created the "robocall challenge" to try and develop, from the public, a way to stop robocalls. Further, the Federal Communications Commission has a dedicated guide to robocalls and increasingly tightens federal regulations on making such calls. Thus, it is clear that this is an unsolved need in the prior art with no obvious solution known, as of the priority filing date of this application.

SUMMARY OF THE DISCLOSED TECHNOLOGY

In one embodiment of the disclosed technology, a telecommunications switch is disclosed. Such a switch is defined as a device which, at least, receives and routes telephone calls. In an embodiment, a telephone switch receives phone calls destined for a phone number associated with a called party, determines if a call from a calling party attempting to connect to the called party via the phone number is wanted, based on prior call data, answers the call when a determination cannot be made as to whether the call is wanted by the called party (which includes forwarding to another device, other than one associated with the called party which answers the call), plays a message to the unverified calling party when the call is answered at the telecommunications switch, and generates a message, the message having at least one number to be received from the calling party. Additionally, the switch stores audio sent to the telecommunications switch from the calling party, if the at least one number (to be provided from the calling party) remains unreceived from the calling party after a pre-defined period of time.

The above "determining if a call is wanted" is determined in the positive when the calling party enters the digit or digits requested of it. This may be done by typing the digits on the phone or the equivalent method of sending DTMF (dual-tone multi-frequency) tones, or pronouncing the phone numbers, as interpreted using voice recognition methods known in the art. When a determination is made that a call is wanted, in embodiments of the disclosed technology, the call is connected to the called party associated with the phone number. The telecommunications switch may further be configured to detect a pre-designated input from the called party, indicating that the call is unwanted. When receiving such an input (such as recognizing a voice command from the called party, receiving a pre-designated DTMF tone or string of DTMF tones from the called party, or other input) then, in embodiments, the calling party is disconnected from the called party, but a connection is maintained between the calling party and the telecommunications switch, and the audio sent to the telecommunications switch (before and/or after disconnection from the called party) is stored in audio format, which includes recording or creating an audio signature based on the recorded audio.

As stated above, audio may be stored in response to a failure to respond properly by the calling party (failure to send the required digit or digits after the phone call was answered). When such audio matches audio of a subsequent call, the audio from the subsequent call is also recorded, and the subsequent call is determined as unwanted, with the appropriate results for an unwanted call, in embodiments of the disclosed technology. Such recordings may be in the form of an audio signature. As recorded audio between phone calls is typically not identical, audio from two calls (or audio signatures) is determined to be within a threshold of closeness which is pre-defined (defined before determining a subsequent call is unwanted). This threshold requirement for determining that audio matches are higher, in embodiments, when comparing to prior stored audio which was to a different called party than when comparing audio to a prior call to the same called party or called telephone number. That is, unwanted calls repeated to the same party are judged more likely to be unwanted than if the audio was found only in a call to a different party, in an embodiment of the disclosed technology.

A method of handling an incoming call, in another embodiment of the disclosed technology, has the following steps. First, one determines if a calling party associated with the incoming call is in a database of pre-allowed callers. If so, then the call is connected to the called party. If not, then the call is answered, by someone other than the called party, and recorded, and conditionally connected and maintained with the called party. This conditional connection and maintenance of the connection, in one embodiment, is initiated upon the calling party sending a code requested by an intermediary between the calling party and the called party. The call may be conditionally maintained to the called party until the called party enters a code designating the caller as "non-allowed" (defined as a code entered by the called party to disconnect the call and indicate to another that the call was/is undesired). After designation of the caller (which, in this instance, includes either or both of the caller or audio associated with the call) as non-allowed, in embodiments of the disclosed technology, the call is maintained in the form of a connection between the calling party and an intermediary while recording audio from the calling party.

The method may further have a step of determining if a calling party associated with the incoming call is non-allowed based on audio of the call, and denying the calling party access to the called party based on such a determination of being non-allowed.

In another method, a phone call is handled based on audio signature. This is accomplished by receiving a call from a caller directed to a called party at a service provider and determining if the call is of a wanted (believed to be desired to be received by the called party, based on prior information received from the called party), unwanted (believed to be desired, by the called party, to be blocked before receiving the called party, based on prior information received from the called party), or of unknown status (not enough information available about the call/caller or called party to know if the called party would want to receive the call). When the call is of a wanted status, the call is allowed to be transmitted to the called party and completed. When the call is of an unwanted status, the call is denied to the called party, or once determined as same (such as during the call), the call is terminated to the called party. When the call is of an unknown status, it is answered at a service provider, where a caller associated with the phone call is prompted to send data, and only if such data is sent is the call transmitted from the caller to the called party.

In the above method, a further step of comparing audio of the call to previously recorded audio associated with at least one prior unwanted call is carried out in embodiments of the disclosed technology, and determination that the call is unwanted is made based on a comparison of the audio. Or, the determination that a call is unwanted may be based on receipt of an entered code from the called party after the call is completed to the called party. That is, the called party designates that a call which went through to the called party is unwanted. Or, a call may be determined to be unwanted by prompting the caller to provide a response for information, and failing to provide a satisfactory response. The response needed may be in the form of an answer to a mathematical question (including a response of a digit equal to what was sent via audio in the phone call, or providing the answer to a mathematical operation sent via audio in the phone call).

In still further embodiments, a call is determined to be unwanted based on an audio signature within a tolerance threshold of audio of prior recorded phone calls (which were unwanted). Such a tolerance threshold may be lower when a match is found to a prior recorded phone call, where the called party matches characteristics of a called party associated with the prior recorded phone call. Still further, lower thresholds may be employed when the characteristics of the called party are the same as characteristics of other called parties where the audio recorded/audio signature is relevant. For example, where the audio matches, within a lower threshold, that of a prior called party having any one of, or a plurality of, the same geographic location, age, religious affiliation, political party affiliation, and group membership, the threshold is lower. Further, based on any one of those characteristics, or a group thereof, one may decide to block calls (designated as unwanted based on audio signature/audio of calls to such parties with that characteristic), while excluding matching audio (within any threshold) if the audio is to parties outside those chosen with certain characteristics. Such characteristics may be provided by the called party, in embodiments, before the call, to the service provider for purposes of decreasing the threshold for calls to other parties with matching characteristics.

DETAILED DESCRIPTION OF EMBODIMENTS OF THE DISCLOSED TECHNOLOGY

The disclosed technology described herein provides devices and methods for preventing the receipt of unwanted calls. This is accomplished by determining, at an intermediate switch between calling party and called party, if the calling party is in a database of previously verified callers. If so, the call is passed on to the called party. If not, then the calling party is prompted to provide data, such as "press 5 to be connected" or "say 'proceed'" before being allowed to connect. The call may be connected to the called party by either path. Once connected, the called party may indicate that the call was/is unwanted and should be disconnected. Then, the call is disconnected from the called party while being maintained with the switch. The call is also recorded in embodiments of the disclosed technology, with the audio therefrom, or audio signature, being used to detect future unwanted calls. The detection of future unwanted calls may further be modified or determined based on association of called parties to each other, which, further, may be used to change the threshold of closeness of audio signatures between calls.

Embodiments of the disclosed technology are described below, with reference to the figures provided.

Figure 3:
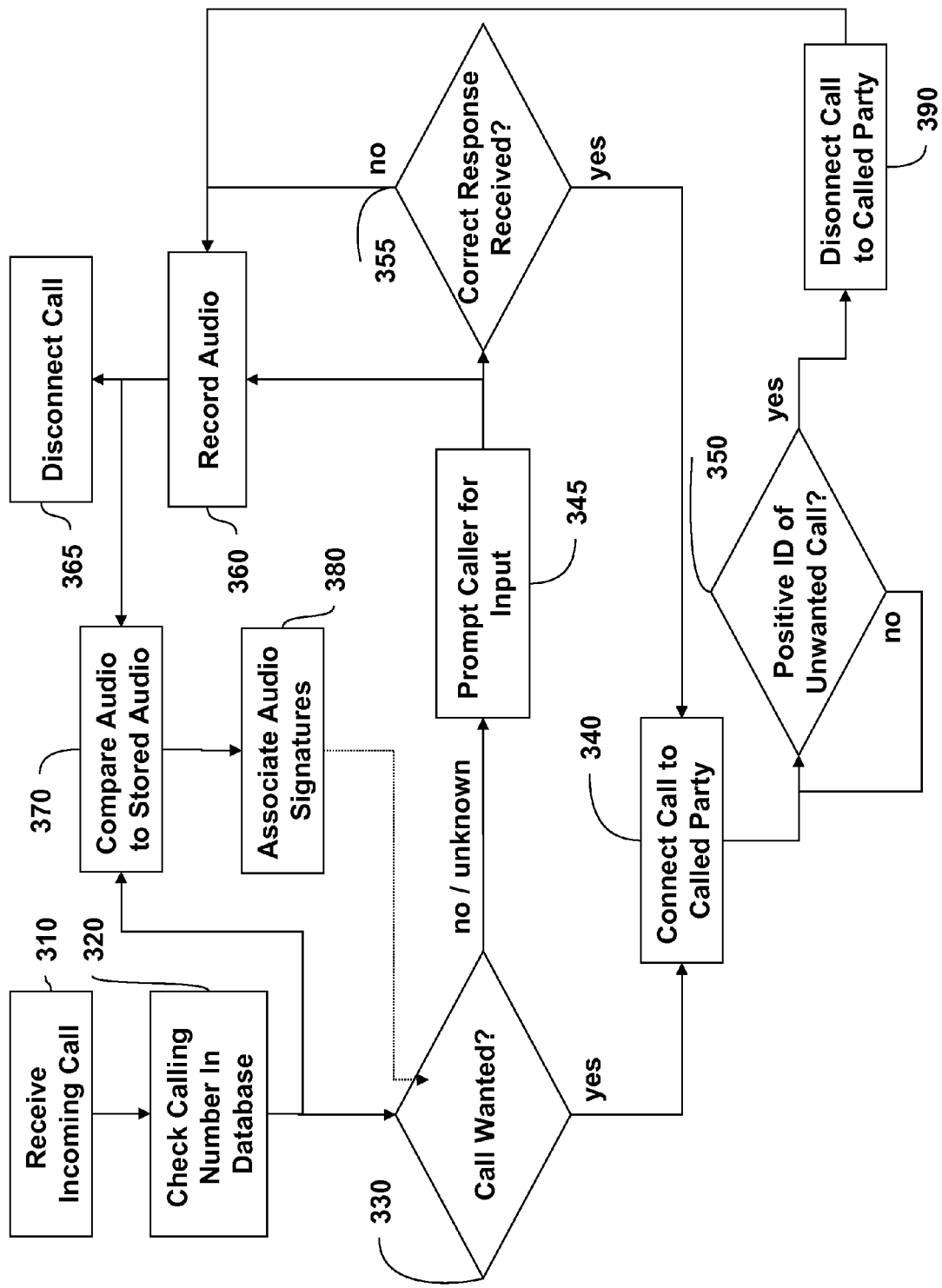
FIG. 3 shows a flow chart of methods of the disclosed technology, as carried out by an intermediate switch.

FIG. 3 shows a flow chart of methods of the disclosed technology, as carried out by an intermediate switch. A switch is defined as a device which, at least, receives and routes telephone calls. A switch may also create and disconnect electrical connections between two devices on a phone network, may record a phone call, may receive/send and interpret DTMF tones or voice prompts, and so forth. Further, when used in this disclosure, a "switch" may include one or more separate devices which are electrically connected, or with exchange data with each other over a network to carry out steps disclosed in the claims of this patent application.

Such a switch, as defined above, receives an incoming call in step 310. This call is designated for a target-called party, such as based on a phone number of the called party (a SIP ID or other equivalents should be understood as being within the concept of "called party," where a SIP ID is a session interface protocol.) Before forwarding the call to the intended recipient/called party, the call is routed within a switch or intermediate switch designated by the called party and/or controlling receipt of phone calls to be passed to the called party. In embodiments of the disclosed technology, the phone number of the calling party is checked in step 320, based on the ANI (automated number identification) or CallerID (calling line identification) information. In embodiments of the disclosed technology, the call is answered by the switch at this point, and a continued ringing sound is played to the calling party, a greeting, a request for a name to be stated, or the like. Meanwhile, when answering the call, the audio received from the calling party is compared to prior stored audio in step 370. This includes a database lookup of audio, based on the determined caller number or other factors to determine the identity or other information about the calling party. In step 380, where audio signatures are stored, the audio signatures (or fingerprints) are compared to further determine, in step 330, if the call is wanted.

Before continuing the description of the figure, it should be understood that an "audio signature" or "audio fingerprint" is a term of art defined as a condensed digital summary, deterministically generated from an audio signal, that is used to identify an audio sample or to quickly locate similar items in an audio database. Perceptual characteristics, how the audio sounds to a human listener, may be used in comparing audio fingerprints in step 380, such as average zero crossing rate, estimated tempo, average spectrum, spectral flatness, prominent tones across a set of bands, and bandwidth.

Either after step 320 and/or step 380 (which may occur concurrently), based on a comparison of audio signatures and calling number (and other factors, which will be described below), it is determined in step 330 if the call from the calling party is wanted. A "wanted" call is one which is identified as being previously verified as a real caller with lack of any indication from the called party that such a caller is unwanted. An "unwanted" call, for purposes of this disclosure, is one in which the calling party cannot be identified as being human or is identified as one which the called party has indicated is not to be received. An "unknown" caller is one in which it is unknown whether a call from such a party is wanted by the called party. If it is determined that the call is "wanted," then the call is connected to the called party in step 340. However, if the call is unwanted or of unknown status, then step 345 is carried out, where the caller is prompted for input. The prompt for input ensures that the caller is human, in order to deny robocallers. The input requested may be in the form of a digit, or string of digits, to enter on the keypad (by way of DTMF) or speak into the telephone. The entered or spoken digits are then interpreted by the telephone switch. Further, in order to confound computers, background noise may be added, mathematical questions may have to be answered (such as, "please say the sum of 4 and the number 5 or enter the sum on your keypad") or the like. If the correct response is received, in step 355, then the call is connected to the called party in step 340. If not, then the audio is recorded in step 360, which will be discussed below.

Once the call is connected to the called party, in step 340, the called party may positively identify the call as being unwanted. In some cases, robocalls may get through the security measures of steps 345 and 355, and in other cases, the caller may, in fact, be human, even though, perhaps, an unwanted telemarketer, prankster, or political caller. As such, a command from the called party may be configured, before the start of the call, to designate a caller as unwanted. Until this is done, the checking for same loops back into step 350. Once a positive identification of an unwanted call is made, such as by entering specific codes on a keypad (such as the "#" key or "999"), saying a specific phrase (such as "put me on your 'do not call' list" or "please tell me more about what you have to offer"), or passing a command to the telephone switch through another mechanism, then step 390 is carried out, whereby the call is disconnected from the called party but maintained by the telecommunications switch.

The call is then recorded in step 360, in order to obtain an audio signature or audio for recognizing future calls from such a caller. In embodiments of the disclosed technology, a call, or all calls, received in step 310 may be recorded from beginning to end, typically, only with the audio of the calling party, the audio discarded if the call is completed successfully (meaning, it is recorded until step 340 of connecting to the called party, or it is recorded until disconnected entirely from the telecommunications switch). That is, when the call is a "wanted" call, which may be indicated by successful response to a request for information prompted in step 345, the call is either not recorded, or the recording is deleted if the call is completed without a positive ID from the called party that the call was/is unwanted. Further, only audio signatures are retained in embodiments of the disclosed technology. In yet further embodiments, no recording takes place between steps 340 and steps 390, as shown in the figure. These varying levels of what is recorded ensure that proper privacy regulations and concerns of the parties are met. In embodiments, a called party may pre-select which portions of calls he or she wants recorded.

After recording the audio, in step 365, a call is disconnected. Simultaneous to, or after recording, the audio, step 370 is carried out to compare the audio to stored audio or audio signatures. The audio signatures (or audio) are associated together in step 380 to get a broader dataset for unwanted callers, to better recognize such unwanted callers in the future. Further, these data may be "crowd-sourced," as shown in FIG. 4.

Figure 4:
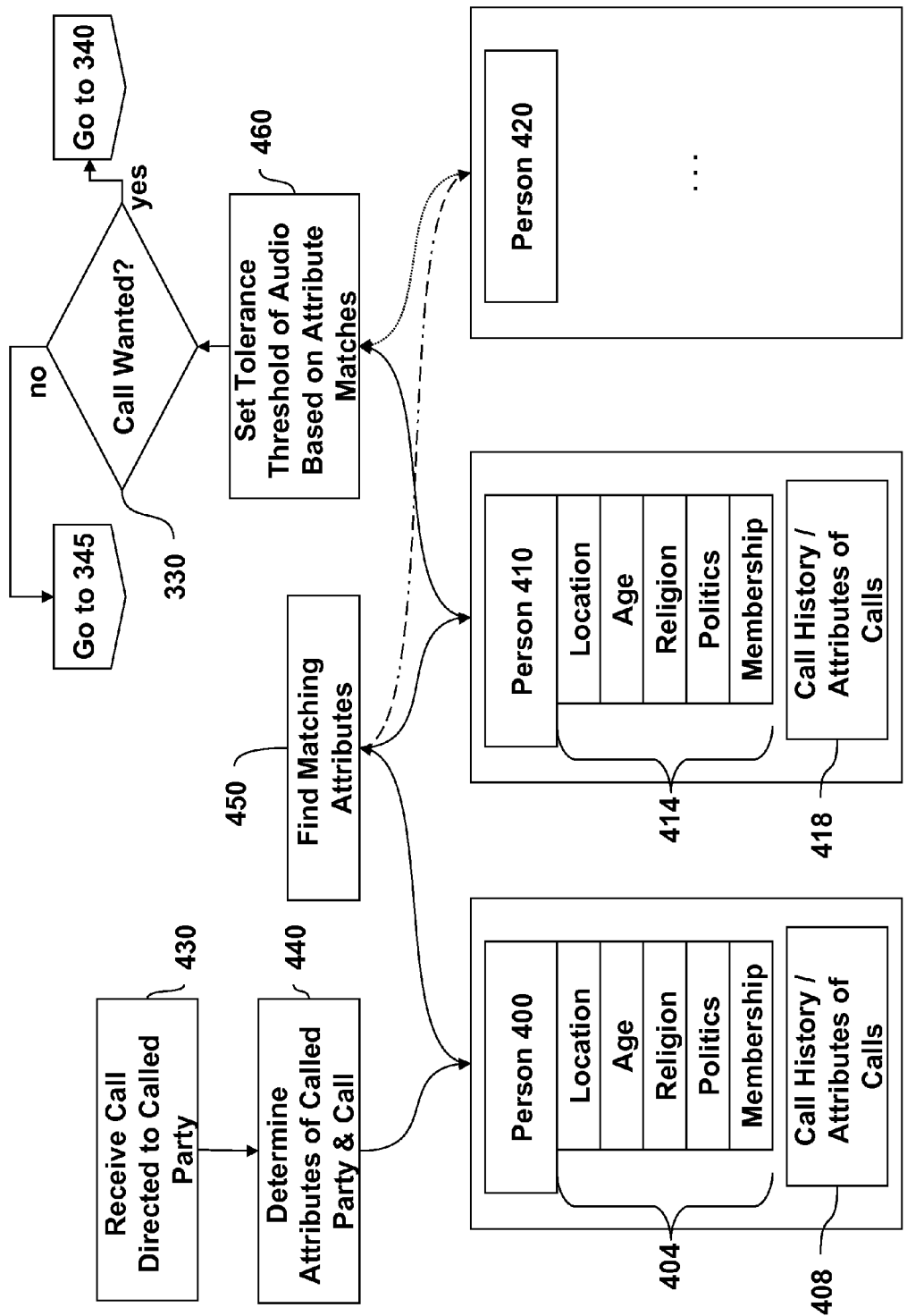
FIG. 4 shows a method of crowd-sourcing call data to determine if a call should proceed to a called party in an embodiment of the disclosed technology.

FIG. 4 shows a method of crowd-sourcing call data to determine if a call should proceed to a called party in an embodiment of the disclosed technology. The steps 430 through 460 are carried out, in one embodiment, as part of step 320 of FIG. 3 referring to a database lookup. In FIG. 4, the database lookup is expanded based on data from multiple parties and their prior designations or receipt of calls which are determined to be wanted or unwanted. Here, in step 430, a call is received directed to a called party. Attributes are determined, in step 440, of both the called party and the call (and/or caller). Attributes are defined herein as data which are directly related to, and associated with, a phone call or party to the phone call which describes a feature attributable to the person or call. Attributes of a call include callerID information (or lack thereof), ANI information, switches or geographic regions from which the call emanated or a party is located, and so forth. This is determined by, when receiving a call, looking up such information from a database. Here, following the arrows from step 440 into the database represented by the bottom half of the figure, data in the database correspond to people (called parties) and their call history. Person 400, who is the called party of the call received in step 430, has certain attributes such as his or her location, age, religion, political memberships or views, and memberships in other groups and associations. Further, the database has stored, and associated with person 400, a call history with attributes of the calls received 408. Such call histories may be limited to calls which were denied, calls which were allowed, or a combination of both, along with audio recordings or audio signatures of part or all of the calls. In this way, as shown in FIG. 3, it may be determined immediately that a call is to be allowed (is wanted) or denied access to the called party (is unwanted).

Assuming the call is not allowed or rejected out of hand based on a determination of the call attributes, then a determination may be made, in part, by way of data provided by others when also comparing the audio signature or recorded audio. For example, person 400 may be in Toms River, N.J., and be an adult member of the Mormon Church, a registered Democrat, and member of the Quilters Association of America (a fictitious organization). When the call received in step 430 is of unknown status in terms of whether it is wanted or not, the audio signature, such as during step 345 (see FIG. 3), may be recorded and/or analyzed. However, audio from one call to the next, even with a robocall, does not usually match 100%, due to various factors, such as line quality, noise, delay, and so forth. If a number of a calling party is known, it can generally be compared between different phone calls passing over the phone switch, and, in fact, may be used in determining that a call is "unknown" or "unwanted" on this basis alone, when previous called parties have indicated such calls are unwanted. However, such data can be spoofed (faked) and is not always provided.

Therefore, by now comparing that a certain audio signature is being found amongst parties who are all registered Democrat Mormons in southern New Jersey, the tolerance threshold between the audio signatures, in step 360, may be lowered. That is, the more attributes between parties which are similar, the lower the threshold of closeness required, in embodiments of the disclosed technology. When person 400 received the call, his attributes 404 and how he or she has handled previous calls (data 408) are compared with the respective attributes 414 and call history/attributes of calls 418 of a second person, 410 who was a previously called party. This may continue on with comparisons to person 420, which represents any number of individual called parties.

Discussing step 460 in more detail, the tolerance threshold of the audio (or audio signature) is based on attribute matches of the caller, called party, and past behavior (taking calls, keeping the call open for a longer period of time, such as greater than three minutes or ten minutes), and association with other parties. In this manner, by crowd-sourcing the data, the appropriate action is more likely to take place for an individual crowd, and patterns can be detected and determined based on information provided by parties who use a service provider employing such a system.

In another example of same, while robocalls are typically easier to detect due to closeness of audio for each call, an individual who is, for example, selling insurance to active military personnel (where fraud has been known to be on a large scale) the caller is typically a live caller. As such, the audio and audio signature will vary more widely than that of a robocall (recorded message); however, many of the phrases stated will be the same from call to call, as will the voice. Each time one of these calls is rejected, such as when a called party indicates the call is unwanted, in step 350 of FIG. 3, the audio signature is known. In fact, the prompt in step 345 for input from the caller may be a request to say a pass phrase such as, "The party you are calling has employed a verification system to avoid robocalls. To proceed, please say the pass phrase, 'save you 20%.'" This is chosen as a phrase that the caller is likely to say, based on comparing attributes of the calling party and called party, so that an audio signature may be obtained. In embodiments, the pass phrase to be said may be pseudo-random or only sometimes pertaining to a likely unwanted caller, so that calling parties do not detect that the system knows they are unwanted, but, rather, believes the pass-phrase road block is unrelated. Further, it may be used to rule out a calling party being the same as a prior called party based on audio signature, but, in any case, the tolerance level or wanted/unwanted status of the call may be adjusted.

Still further, when a pass-phrase is determined to be one from an unwanted caller (or simply completed improperly), based on comparison of audio signature and threshold set therefor, as a function of attributes in common, then the call may be forwarded to an operator at the service provider and/or a government agency (or the audio may simply be provided, with call data, in real time, to a government agency) to detect scam artists and others breaking the law. When an operator receives the call, unbeknownst to the calling party, the calling party has received a different person than the called party who may talk to the calling party in order to get further audio data from the calling party to be used to block future calls and/or adjust tolerance levels.

Figure 1:
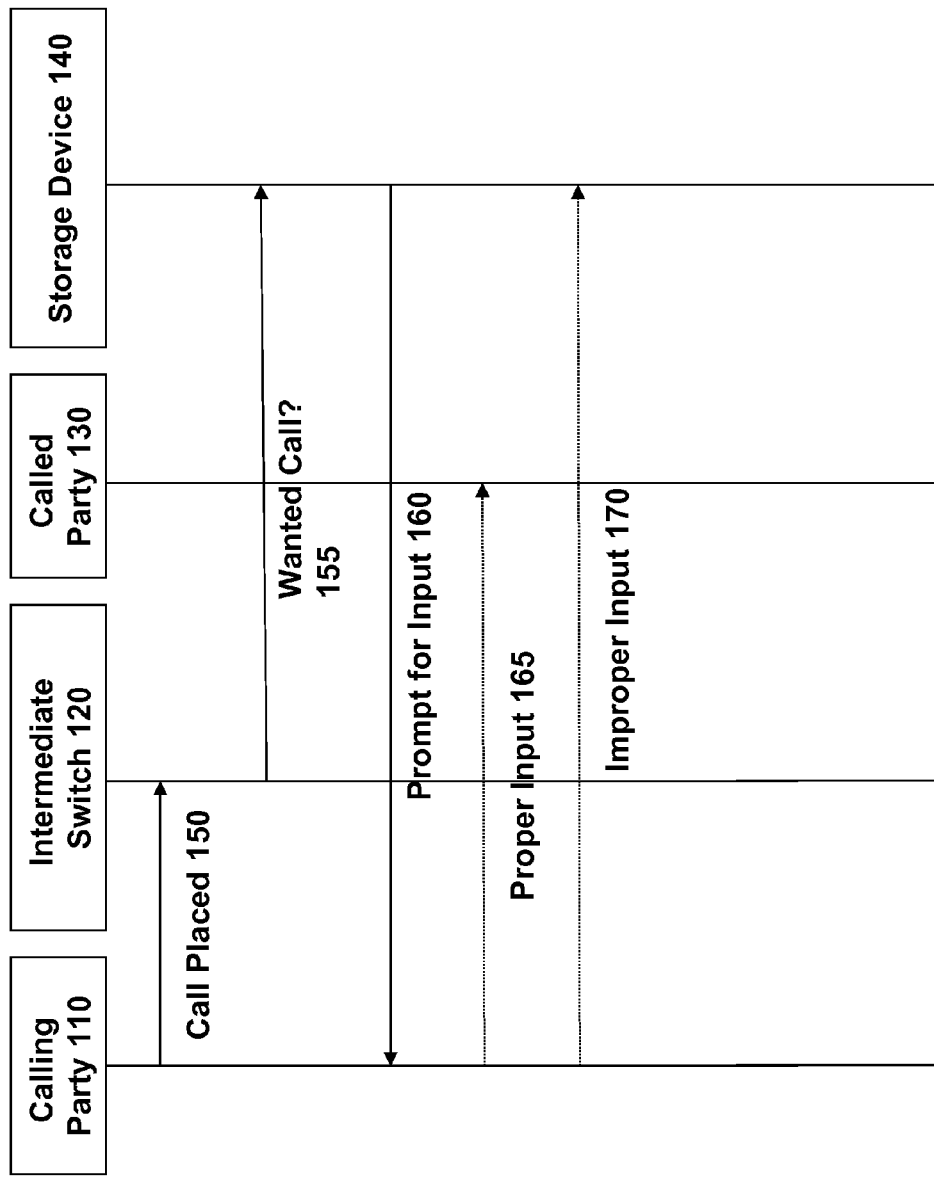
FIG. 1 shows a diagram of steps taken when a received call is unwanted or is of unknown status, in an embodiment of the disclosed technology.
Figure 2:
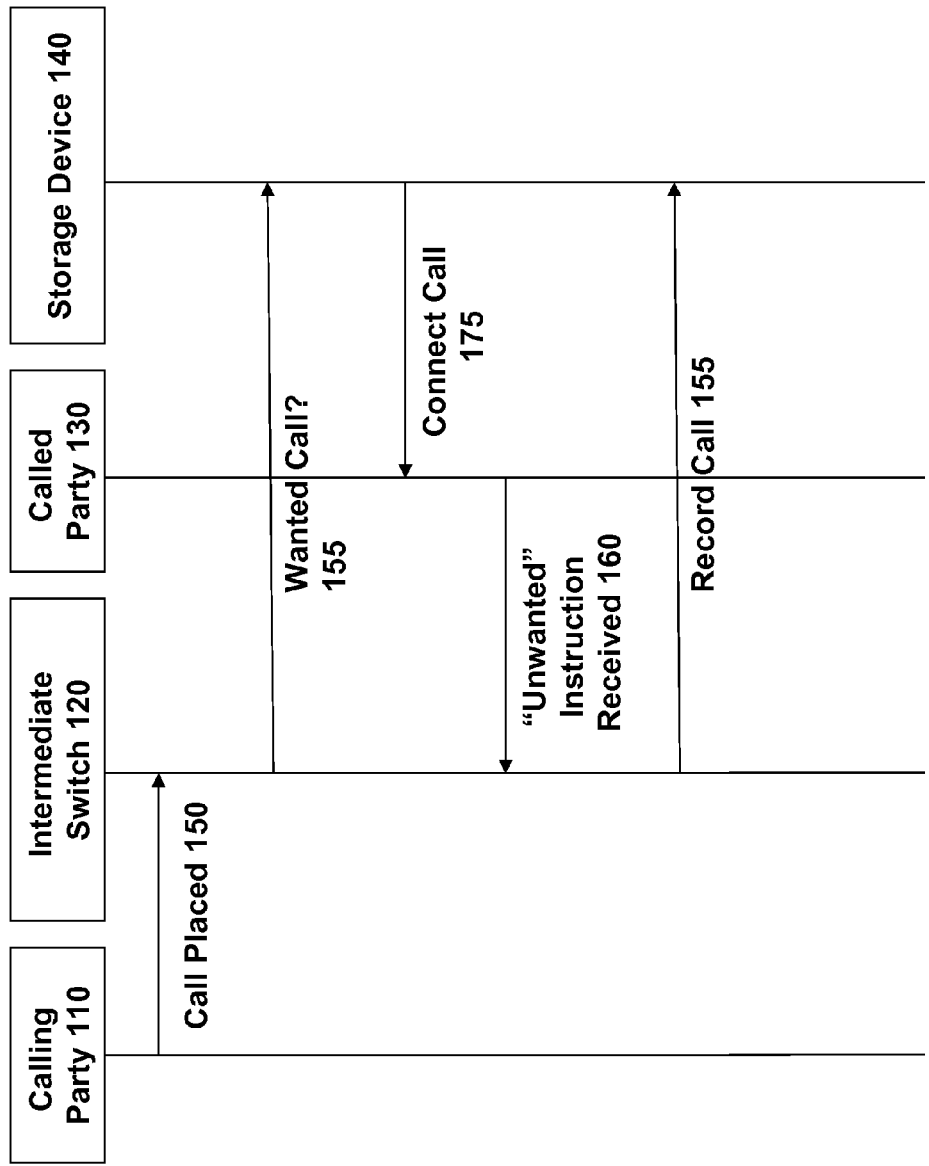
FIG. 2 shows a diagram of steps taken when a call is received by a called party but subsequently designated as unwanted, in an embodiment of the disclosed technology.
Figure 5:
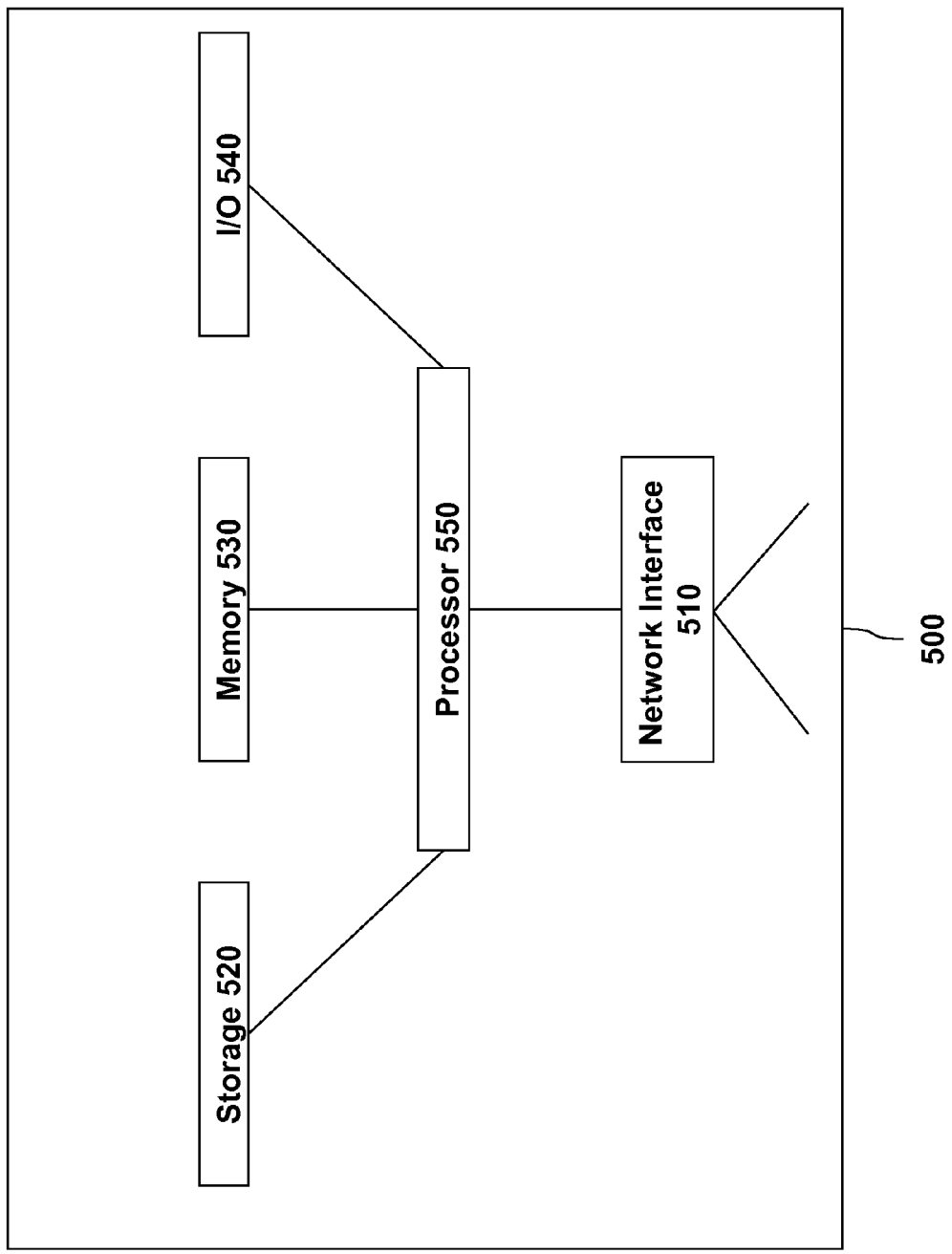
FIG. 5 shows a high-level block diagram of a device that may be used to carry out the disclosed technology.

Now turning to FIGS. 1 and 2, FIG. 1 shows a diagram of steps taken when a received call is unwanted or of unknown status, in an embodiment of the disclosed technology. A calling party 110 is one who initiates a call to an intended called party 130. The intermediate switch 120 is a telecommunications switch for which the call must pass through before being connected to the called party 130. The telecommunications switch processes calls to a DID (direct inward dialing) number, in embodiments of the disclosed technology. The storage device 140, as described in FIG. 5, is a magnetic, optical, or other storage device used to store and recall database entries and used, in conjunction with a processor, to determine how to handle a phone call. A calling party places a call 150 which is connected to a specific intermediate switch 120. The intermediate switch determines if the call is wanted in step 155 by accessing a storage device (and carrying out steps shown and described with respect to FIGS. 3 and 4). In the method shown in FIG. 1, the call is determined to be of unknown status, meaning that it is not on the list of callers pre-approved by the called party 130 (or other trusted parties, such as those sharing a characteristic or affiliation of the called party, as determined/selected by the called party before the call, and/or, in embodiments, based on crowd-sourced data). As such, the calling party 110 is prompted for input in step 160 in the form of a digit to be entered or number/phrase to speak. If proper input is given in step 165, the call is forwarded to the called party 130. If improper input, unacceptable input, or input verifying the caller as unwanted is given, then the call recording or audio signature is sent to the storage device 140.

FIG. 2 shows a diagram of steps taken when a call is received by a called party but subsequently designated as unwanted, in an embodiment of the disclosed technology. Where numbered elements are the same, elements of FIG. 1 remain the same as that of FIG. 2. Here, after step 155, the call is determined as a wanted/desired call, as the caller either passed the challenge stage and entered the proper input, or such a step was not carried out because either the caller had previously been verified or simply because the called party elected not to use such a feature. Therefore, the call is determined as "wanted," or simply proceeds from the calling party 110 to the called party 130 through the intermediate switch 120. When conducting a database lookup from the storage device 140 in making the determination of a call being "wanted," the call is connected to the called party in step 175. From there, the called party 130 may decide, or realize, that the call is from a telemarketer or other unwanted party. The called party 130 then gives an "unwanted" instruction to the intermediate switch 120 in step 160. This instruction may be sent in the form of a stated phrase (such as "wow, tell me more"), entered code on the telephone keypad, or code provided by an alternative route (button on a soft phone [computer emulation of a phone] or specific button on a specialized phone). Once the code is received, the calling party is disconnected from the called party 130 and is passed, at least, to the storage device 140, where the rest of the call, or call up to this point, or both, is stored for later retrieval and analysis when comparing the audio or audio signature to future calls. As such, this audio or audio signature may be used to make better determinations about the wanted or unwanted status of future calls.

FIG. 5 shows a high-level block diagram of a device that may be used to carry out the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one or a plurality of input network interfaces for communicating with other devices via a network (e.g., the internet). The device 500 further includes an electrical input interface. A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device for illustrative purposes. It should also be understood by one skilled in the art that the method and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A telecommunications switch, comprising:
   an input port receiving phone calls destined for a phone number associated with a called party;
   a processor, which, when a determination cannot be made if a call made by a calling party is wanted by said called party, answers said call;
   said processor determining if said call from said calling party attempting to connect to said called party via said phone number is unwanted, based on prior call data, by conducting audio comparisons between audio of said call to stored audio or a stored audio signature of a previous unwanted call;
   an output port via which data is sent, when said call is answered at said telecommunications switch, said data being representative of a message to said calling party, said message requiring at least one number to be received from said calling party; and
   a memory component, storing audio of said calling party recorded during said step of said processor answering said call, wherein said audio is sent to said telecommunications switch;
   wherein phone call routing by way of said processor or another processor is improved based on updated instructions stored in said switch, the instructions updated based on a threshold of closeness of said audio or said audio signature of said prior call to audio of said call from said calling party in order to make said determination if said call is unwanted;
   wherein upon receipt of another phone call to said input port, said threshold of closeness used to determine if said another call is unwanted is different if said another call directed to said called party versus if said another call directed to a different called party.

2. The telecommunications switch of claim 1, wherein said processor determines said call from if said calling party is wanted if said calling party sends said at least one number.

3. The telecommunications switch of claim 2, wherein said switch further comprises stored instructions to determine, when if said call is wanted, to connect said call to said called party associated with said phone number.

4. The telecommunications switch of claim 3, wherein following said connection of said call from said calling party to said called party:
   said processor carries out instructions to detect a pre-designated input received from said called party indicating that said call is unwanted; and
   upon detection of said pre-designated input:
      disconnecting, by said switch, said calling party from said called party;
      maintaining said call from said calling party to said telecommunications switch; and
      storing said audio sent to said telecommunications switch from said calling party on a tangible storage medium.

5. A method of handling a phone call based on audio signature, comprising the steps of:
   at a service provider input port, receiving a call from a caller, said call directed to a called party;
   employing a processor to determine if said call is of a wanted, unwanted, or unknown status;
   where said call is of a wanted status, allowing said call to be connected to said called party via a switch;
   where said call is of an unwanted status, denying or terminating connection of said call to said called party via a switch;
   where said call is of an unknown status:
      answering said call at said service provider;
      prompting said caller of said call to send data; and
      connecting said call to said called party only if said data is received from said caller,
   wherein said employing a processor to determine if said call is unwanted is based on receipt of an entered code from said called party after said call is connected to said called party and an audio signature of said call being within a tolerance threshold of audio signatures of prior recorded unwanted phone calls, wherein said tolerance threshold is lower when a match is found to a prior recorded phone call where characteristics of said called party match characteristics of a called party associated with said prior recorded phone call.

6. The method of claim 5, wherein said step of employing a processor to determine if said call is of a wanted, unwanted, or unknown status further comprises employing said processor to compare audio of said call to previously recorded audio associated with at least one prior unwanted call and to determine if said call is unwanted based on said comparing of said audio.

7. The method of claim 5, wherein said employing a processor to determine if said call is unwanted is based on requesting that said caller provide a response to a prompt for information, and failing to receive a satisfactory response.

8. The method of claim 7, wherein said response is in the form of an answer to a mathematical question.

9. The method of claim 5, wherein said characteristics of said called party are selected from the group consisting of geographic location, age, religious affiliation, political party affiliation, and group membership.

10. The method of claim 5, wherein said prompting a caller comprises prompting said caller to say a phrase, said phrase being recorded in a prior call and matching a received audio response with prior recorded audio of said prior call.

11. The method of claim 5, further comprising a step of passing attributes of said call and audio of said call to a government agency in real-time during said call.

12. A method of, handling a phone call based on audio signature, comprising steps of:
- at a service provider input port, receiving a call from a caller, said call directed to a called party;
- employing a processor to determine if said call is of a wanted, unwanted, or unknown status;
- where said call is of a wanted status, allowing said call to be connected to said called party via a switch;
- where said call is of an unwanted status, denying or terminating connection of said call to said called party via a switch;
- where said call is of an unknown status:
  - answering said call at said service provider;
  - prompting said caller of said call to send data; and
  - connecting said call to said called party only if said data is received from said caller,
- wherein said employing a processor to determine if said call is unwanted is based on receipt of an entered code from said called party after said call is connected to said called party and an audio signature of said call being within a tolerance threshold of audio signatures of prior recorded unwanted phone calls, wherein said tolerance threshold is lower when a match is found to a prior recorded phone call where characteristics of said called party match characteristics of a called party associated with said prior recorded phone call;
- wherein said characteristics of said called party are selected from the group consisting of geographic location, age, religious affiliation, political party affiliation, and group membership; and
- wherein at least one said characteristic is provided by said called party to said service provider before said call, for the purpose of decreasing said threshold for calls to other parties with said at least one characteristics.

* * * * *